(12) United States Patent
Cho et al.

(10) Patent No.: US 8,555,133 B2
(45) Date of Patent: Oct. 8, 2013

(54) RATE MATCHING APPARATUS AND RATE MATCHING METHOD THEREOF

(75) Inventors: Dae Soon Cho, Daejeon (KR); EunTae Kim, Daejeon (KR); Hee Sang Chung, Daejeon (KR); JungSook Bae, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 311 days.

(21) Appl. No.: 13/020,143

(22) Filed: Feb. 3, 2011

(65) Prior Publication Data

US 2012/0069915 A1 Mar. 22, 2012

(30) Foreign Application Priority Data

Sep. 17, 2010 (KR) .......................... 10-2010-0091820

(51) Int. Cl.
*H03M 13/00* (2006.01)
(52) U.S. Cl.
USPC ............................ 714/755; 714/786; 714/801
(58) Field of Classification Search
USPC ................................................ 714/752, 755
See application file for complete search history.

(56) References Cited

U.S. PATENT DOCUMENTS

| 7,114,121 | B2 | 9/2006 | Oda |
| 7,924,763 | B2* | 4/2011 | Nimbalker et al. ........... 370/315 |
| 7,986,741 | B2* | 7/2011 | Tsai et al. ..................... 375/261 |
| 8,181,099 | B2* | 5/2012 | Miyazaki et al. ............. 714/801 |
| 8,189,559 | B2* | 5/2012 | Pi et al. ........................ 370/351 |
| 8,234,557 | B2* | 7/2012 | Miyazaki et al. ............. 714/801 |

FOREIGN PATENT DOCUMENTS

| KR | 10-0348279 | 8/2002 |
| KR | 10-0404181 | 11/2003 |

OTHER PUBLICATIONS

Cho, Dae-Soon et al., "An Implemented Parallel Rate Matching Algorithm for 3G LTE System," 14th IEEE ISCE (2010).

* cited by examiner

*Primary Examiner* — Esaw Abraham
(74) *Attorney, Agent, or Firm* — Nelson Mullins Riley & Scarborough LLP (57) ABSTRACT

Provided is a rate matching apparatus. The rate matching apparatus includes interleavers, dummy bit removers, a bit collector, a memory and a selector. The interleavers interleave code blocks, respectively. The dummy bit removers remove dummy bits of the interleaved code blocks, respectively. The bit collector collects code blocks with the dummy bits removed by bit units, and divides a collected data bit stream into systematic data and parity data. The memory stores the systematic data and the parity data in parallel. The selector outputs in parallel a plurality of data bits which are selected from the systematic data and parity data of the memory.

17 Claims, 5 Drawing Sheets

RATE MATCHING APPARATUS AND RATE MATCHING METHOD THEREOF

CROSS-REFERENCE TO RELATED APPLICATIONS

This U.S. non-provisional patent application claims priority under 35 U.S.C. §119 of Korean Patent Application No. 10-2010-0091820, filed on Sep. 17, 2010, the entire contents of which are hereby incorporated by reference.

BACKGROUND OF THE INVENTION

The present invention disclosed herein relates to a communication system, and more particularly, to a rate matching apparatus and method in the communication system.

In a general communication system, rate matching is to control the amount of data to transmit and the maximum transmission rating of an actual physical channel. For this, rate matching uses an operation algorithm that deletes or repeats the bits of a Transport Block (TB) in a transmission channel according to the bit size of a physical channel frame which is the transmission unit of a corresponding physical channel.

In the current communication system, data transmitted for supporting data throughput are increasing. However, the transmitter of the communication system performs rate matching in series. Such serial rate matching has limitations in improving of data throughput.

SUMMARY OF THE INVENTION

The present invention provides a rate matching apparatus and a rate matching method thereof, which increase data throughput.

The present invention also provides a rate matching apparatus and a rate matching method thereof, which shorten a time taken in rate matching.

Embodiments of the present invention provide a rate matching apparatus including: a plurality of interleavers interleaving code blocks, respectively; a plurality of dummy bit removers removing dummy bits of the interleaved code blocks, respectively; a bit collector collecting code blocks with the dummy bits removed by bit units, and dividing a collected data bit stream into systematic data and parity data; a memory storing the systematic data and the parity data in parallel; and a selector outputting in parallel a plurality of data bits which are selected from the systematic data and parity data of the memory.

In some embodiments, the rate matching apparatus may further include: an output parameter generator generating an output parameter on the basis of the systematic data and parity data with the dummy bits removed.

In other embodiments, the selector may select and output data in parallel according to the output parameter.

In still other embodiments, the output parameter may include a start point, end point and data size of data to be outputted according to removal of the dummy bit.

In even other embodiments, the selector may output data from the start point to the end point, repeatedly select data until data, corresponding to the data size, from the first start point to the end point of the data stored in the memory is outputted, and output the selected data in parallel.

In yet other embodiments, the output parameter generator may receive dummy bit removal information based on removal of the dummy bit from the dummy bit removers, and generate the output parameter on the basis of the dummy bit removal information.

In further embodiments, the memory may include: at least one systematic memory having a plurality of input ports and/or output ports; and at least one parity memory having a plurality of input ports and/or output ports.

In still further embodiments, the parity data may include first and second parity data.

In even further embodiments, the bit collector may alternately collect the first and second parity data by bit units when collecting the parity data.

In yet further embodiments, the dummy bits may include a null bit and a filler bit.

In other embodiments of the present invention, a rate matching method includes: removing dummy bits of interleaved code blocks; dividing code blocks with the dummy bits removed into systematic data and parity data, and storing the divided data in parallel; and outputting the stored data in parallel.

In some embodiments, the outputting of the stored data may include outputting data by using an output parameter for output of data based on removal of the dummy bit.

In other embodiments, the output parameter may include a start point, end point and data size of data to be outputted according to removal of the dummy bit.

In still other embodiments, the outputting of the stored data may include: outputting data from the start point to the end point; and repeatedly selecting data until data, corresponding to the data size, from the first start point to the end point of the stored data is outputted, and outputs the selected data in parallel.

In still other embodiments of the present invention, a rate matching method include: interleaving code blocks; removing dummy bits of the interleaved code blocks; collecting code blocks with the dummy bits removed, by bit units; dividing the collected data bits into systematic data and parity data to store the divided data in parallel; and outputting in parallel a plurality of data bits which are selected from the stored systematic data and parity data.

In some embodiments, the collecting of code blocks may include collecting the code blocks with the dummy bits removed as the systematic data and the parity data.

In other embodiments, as the parity data, first and second parity data may be alternately collected by bit units.

In still other embodiments, the outputting of data bits may include: calculating an output parameter on the basis of the systematic data and parity data with the dummy bits removed; and outputting the selected data bits in parallel according to the output parameter.

In even other embodiments, the output parameter may include a start point, end point and data size of data to be outputted according to removal of the dummy bit.

In yet other embodiments, the dummy bits may include a null bit and a filler bit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, exemplary embodiments of the inventive concept are not limited to specific forms and are exaggerated for clarity. Moreover, like reference numerals refer to like elements throughout.

In this disclosure below, the term and/or includes any and all combinations of one or more of the associated listed items. Moreover, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A rate matching apparatus according to an embodiment of the present invention removes dummy bits before the parallel processing operation of data bits for rate matching, and thus can perform data bits in parallel in rate matching.

The rate matching apparatus according to an embodiment of the present invention may be included in a transmitter. Moreover, the rate matching apparatus may be implemented in an encoder.

The rate matching apparatus according to an embodiment of the present invention transmits one Transmission Block (TB) during a Transmission Time Interval (TTI). The one transmission block may include a plurality of code blocks. The rate matching apparatus may perform rate matching by code block units.

Figure 1:
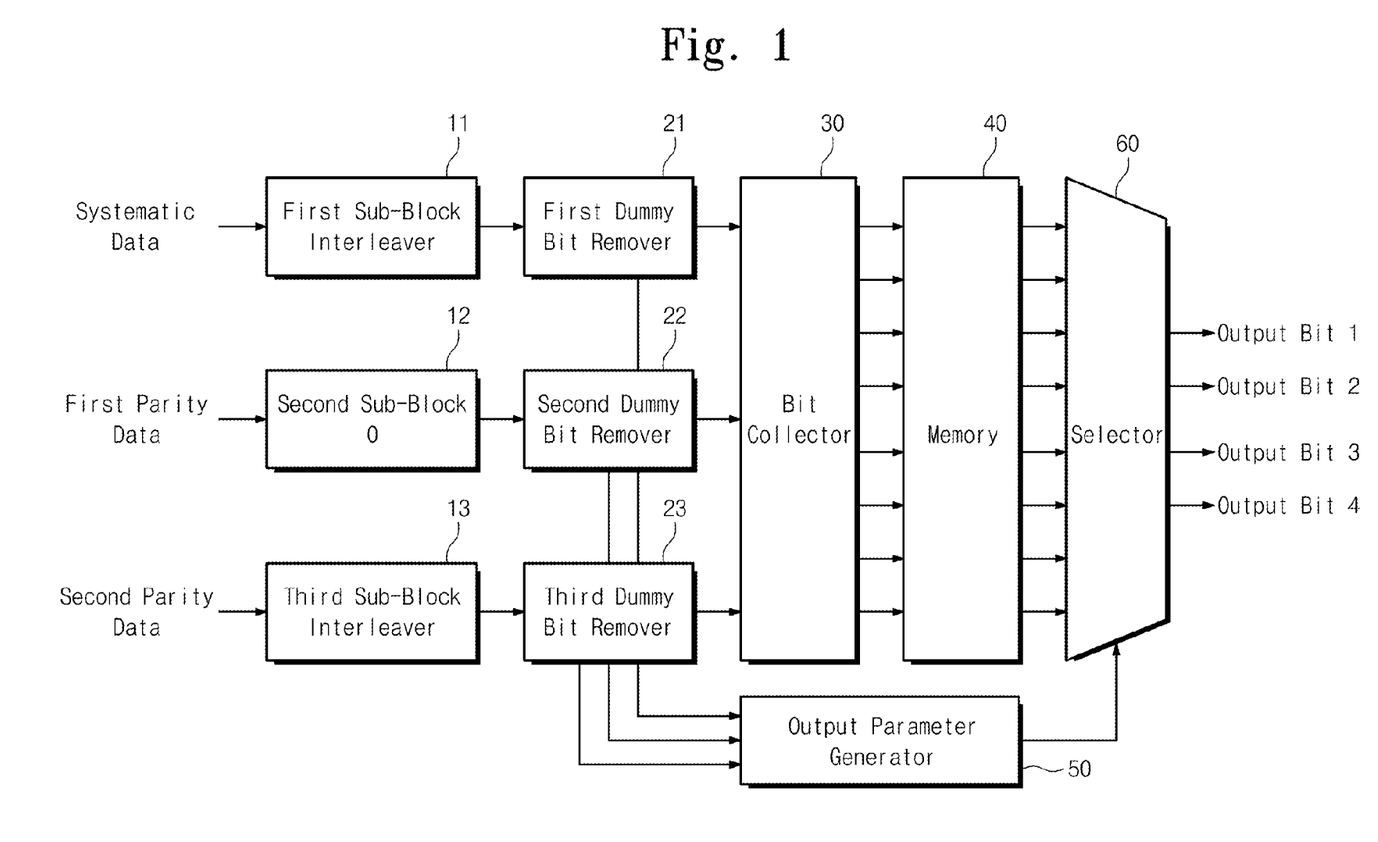
FIG. 1 is a block diagram exemplarily illustrating a rate matching apparatus according to an embodiment of the present invention.

FIG. 1 is a block diagram exemplarily illustrating a rate matching apparatus according to an embodiment of the present invention.

Referring to FIG. 1, a rate matching apparatus according to an embodiment of the present invention includes sub-block interleavers 11 to 13, dummy bit removers 21 to 23, a bit collector 30, a memory 40, an output parameter generator 50, and a selector 60.

The sub-block interleavers 11 to 13 interleave data received. Herein, interleaving is to distribute data having an error for preventing the loss of data due to a burst error.

The first sub-block interleaver 11 receives and interleaves a first codeword (for example, systematic data). The first sub-block interleaver 11 outputs an interleaved first code block to the first dummy bit remover 21. Herein, the systematic data is information data to be transmitted.

The second sub-block interleaver 12 receives and interleaves a second codeword (for example, first parity data). The second sub-block interleaver 12 outputs an interleaved second code block to the second dummy bit remover 22. Herein, the first parity data is parity check data mapped to the systematic data.

The third sub-block interleaver 13 receives and interleaves a third codeword (for example, second parity data). The third sub-block interleaver 13 outputs an interleaved third code block to the third dummy bit remover 23. Herein, the second parity data is parity check data mapped to the systematic data like the first parity data. That is, the first and second parity data are parity check data, and a receiving side may detect and correct the error of the systematic data using the parity data.

The first to third sub-block interleavers 11 to 13 may perform interleaving operations for the systematic data, the first parity data and the second parity data by code block units, respectively.

The dummy bit removers 21 to 23 remove dummy bits included in the respective codewords (for example, the systematic data, the first parity data and the second parity data), respectively. Herein, the dummy bit includes at least one of a null bit and a filler bit. The null bit is a bit that is used for guaranteeing a code block size, for example, the integer times of 32 bits. The filler bit is a bit that is used for guaranteeing the even times of the minimum number of code blocks.

The first dummy bit remover 21 removes a dummy bit included in the interleaved first codeword. The first dummy bit remover 21 outputs the first codeword with the dummy bit removed to the bit collector 30.

The second dummy bit remover 22 removes a dummy bit included in the interleaved second codeword. The second dummy bit remover 22 outputs the second codeword with the dummy bit removed to the bit collector 30.

The third dummy bit remover 23 removes a dummy bit included in the interleaved third codeword. The third dummy bit remover 23 outputs the third codeword with the dummy bit removed to the bit collector 30.

Moreover, the first to third dummy bit removers 21 to 23 may output the information of the removed dummy bits to the output parameter generator 50, respectively.

The bit collector 30 collects the codewords from which the dummy bits have respectively been removed. The bit collector 30 collects entire systematic data, and alternately collects the first and second parity data by bit units. Therefore, when it is assumed that the systematic data is indicated as S, the first parity data is indicated as P1 and the second parity data is indicated as P2, data bits collected by the bit collector 30 form a data bit stream of "S, P1, P2, P1, P2, P1, P2, . . . ".

The bit collector 30 divides the collected data bits into systematic data and parity data (for example, first and second parity data), and stores the divided data in the memory 40.

The bit collector 30 divides the collected data bits into the systematic data and the parity data, and stores the divided data in the memory 40. When a plurality of storage regions for respectively storing the systematic data and the parity data exist in the memory 40, the bit collector 30 stores the systematic data and the parity data in the storage regions, respectively.

The memory 40 divides and stores in parallel the systematic data and the parity data.

The output parameter generator 50 receives dummy bit information, and generates an output parameter on the basis of the dummy bit information. Herein, the output parameter includes a start point K0_2, an end point Ncb_2 and a first rate matching data size Kp, for rate matching. The output parameter is generated according to a data bit stream of "S, P1, P2, P1, P2, P1, P2, . . . " from which a dummy bit has been removed.

The output parameter generator 50 provides an output parameter to the selector 60 in order to select a data bit for rate matching on the basis of a data bit stream.

The selector 60 selects a plurality of data bits from among one of the systematic data and parity data that are stored in the memory 40 and outputs the selected data bits, on the basis of the output parameter.

In an embodiment of the present invention, the dummy bit removers 21 to 23 respectively remove dummy bits included in code blocks that are provided to the bit collector 30, and thus do not require a complex algorithm or a complex hardware structure for removing the dummy bits according to parallel data processing. Therefore, the rate matching apparatus according to an embodiment of the present invention can perform rate matching independent of a dummy bit.

Figure 2:
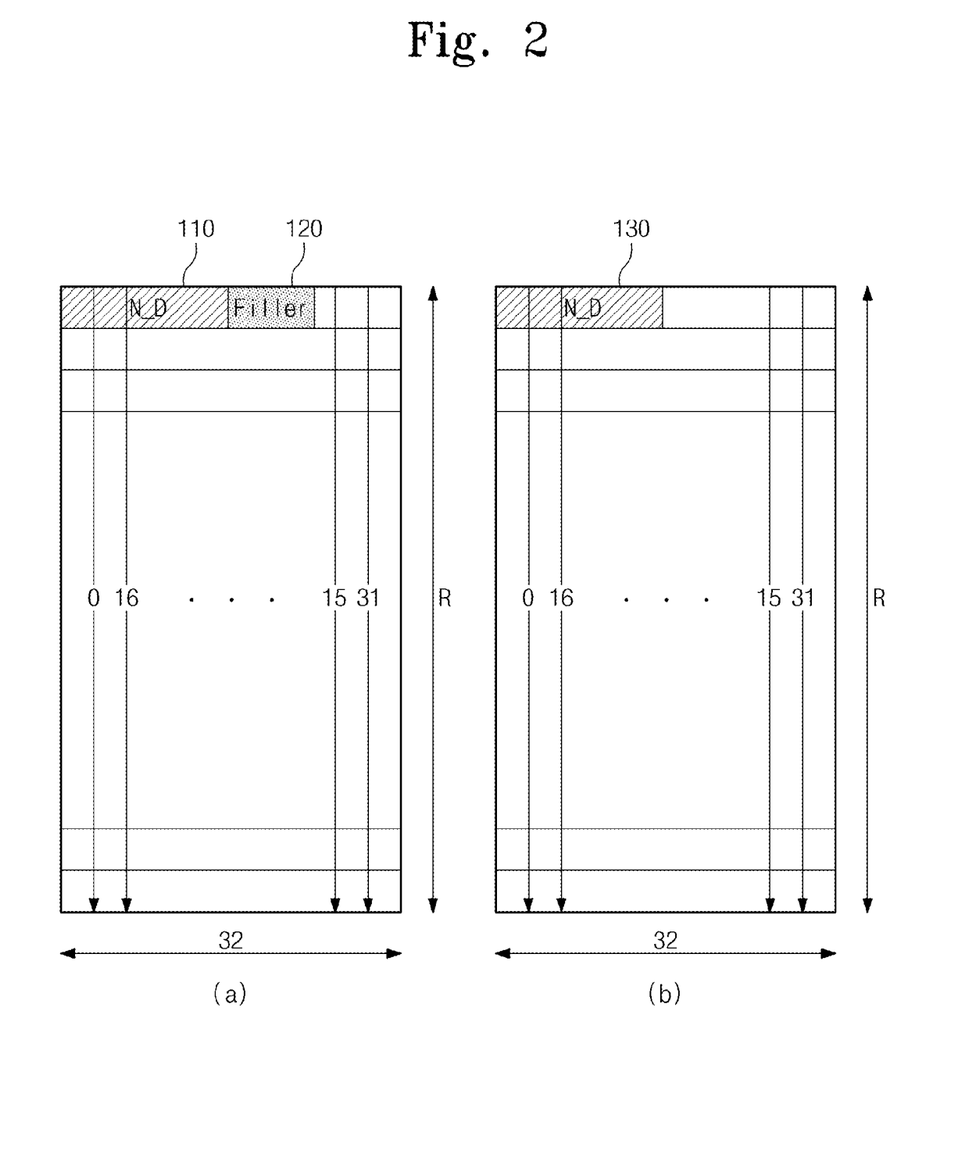
FIG. 2 is a diagram illustrating code blocks for an interleaving operation in FIG. 1.

FIG. 2 is a diagram illustrating code blocks for an interleaving operation in FIG. 1.

Referring to FIG. 2, the code blocks interleaved by the sub-block interleavers 11 to 13 are illustrated as an example.

A portion (a) of FIG. 2 illustrates a code block that includes a null bit 110 and a filler bit 120 among the dummy bits. A portion (b) of FIG. 2 illustrates a code block that includes only a null bit 130 among the dummy bits.

As an example, the column (abscissa axis) of a code block may be configured with 32 bits, and the row (ordinate axis) of the code block may be configured with an R number of bits. For example, if the maximum size of a code block is 6144 bits, the maximum value of R is 192.

For example, when a row size is 32 bits and entire data is not divided by 32, a code block may be set to become a multiple of 32 by adding a null bit. Therefore, the minimum number of dummy bits is 0, and the maximum number of dummy bits is 31.

$$R=(\text{in\_size}+31) >> 5 \quad (1)$$

where R is the row of a code block, in_size is an entire data size, and >>5 indicates an operation that shifts binary data by 5 bits to the right.

Moreover, the size of a null bit (NB) may be obtained through Equation (2) below.

$$NB=R*32-\text{in\_size} \quad (2)$$

where NB is a null bit.

For example, if in_size=65, "in_size+31" in Equation (1) is 96 (which is a binary number "1100000"). In R, by shifting "1100000" by 5 bits to the right, a binary number "11" (which is 3) may be obtained. At this point, NB becomes 31 by Equation (2) (R=3, in_size=65).

As described above, a code block may include a null bit or a filler bit, and may be configured as an R×32 matrix.

For example, the first and second sub-block interleavers 11 and 12 may perform interleaving on the basis of the following Table 1 when performing an interleaving operation for the systematic data and the first parity data.

TABLE 1

| Number of columns (C) | Inter-column permutation pattern <P1(0), P1(1), . . . , P1(C − 1)> |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

As an example, the inter-column permutation pattern shown in the Table 1 corresponds to an interleaving pattern for the systematic data and the first parity data.

For example, the third sub-block interleaver 13 may perform interleaving on the basis of the following Table 2 when performing an interleaving operation for the second parity data.

TABLE 2

| Number of columns (C) | Inter-column permutation pattern <P2(0), P2(1), . . . , P2(C − 1)> |
|---|---|
| 32 | <1, 17, 9, 25, 5, 21, 13, 29, 3, 19, 11, 27, 7, 23, 15, 31, 2, 18, 10, 26, 6, 22, 14, 30, 4, 20, 12, 28, 8, 24, 16, 0> |

As an example, the inter-column permutation pattern shown in the Table 2 corresponds to an interleaving pattern for the second parity data.

The first to third sub-block interleavers 11 to 13, which have performed interleaving with the above-described interleaving pattern, sequentially output data in each row direction.

The null bits 110 and 130 and the filler bit 120 are removed through the first to third dummy bit removers 21 to 23.

Figure 3:
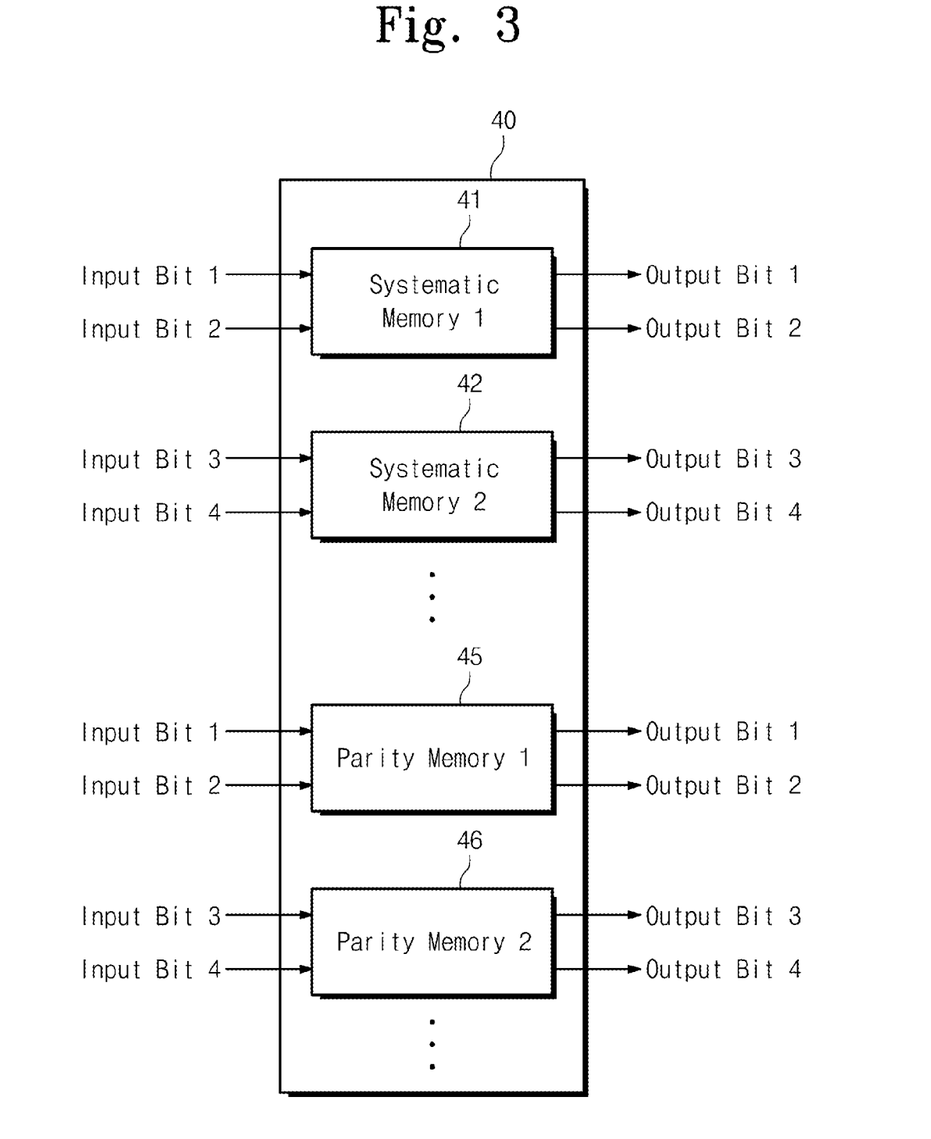
FIG. 3 is a block diagram illustrating a memory of FIG. 1.

FIG. 3 is a block diagram illustrating the memory of FIG. 1.

Referring to FIG. 3, the memory 40 includes a plurality of systematic memories 41 and 42, and a plurality of parity memories 45 and 46. In this way, the memory 40 may include a plurality of internal memories.

The systematic memories 41 and 42 store systematic data. Herein, each of the systematic memories 41 and 42 has a plurality of input/output ports. As an example, a block Random Access Memory (RAM) having two input ports and output ports may be used as each of the systematic memories 41 and 42.

The systematic memory 41 may receive first and second input bits, and may output first and second output bits. The systematic memory 42 may receive third and fourth input bits, and may output third and fourth output bits.

The parity memories 45 and 46 store first and second parity data, respectively. Herein, each of the parity memories 45 and 46 has a plurality of input/output ports. As an example, a block RAM having two input ports and output ports may be used as each of the parity memories 45 and 46.

The parity memory 45 may receive first and second input bits, and may output first and second output bits. The parity memory 46 may receive third and fourth input bits, and may output third and fourth output bits.

In this way, the memory 40 stores and outputs data in parallel through a plurality of memories (for example, the systematic memories 41 and 42, the parity memories 45 and 46), and thus can simultaneously process a plurality of data in parallel.

The case where there are two systematic memories and parity memories has been described above as an example, but the memory 40 may include two or more systematic memories and parity memories. Also, the systematic memory and the parity memory may have two or more input/output ports, respectively.

Figure 4:
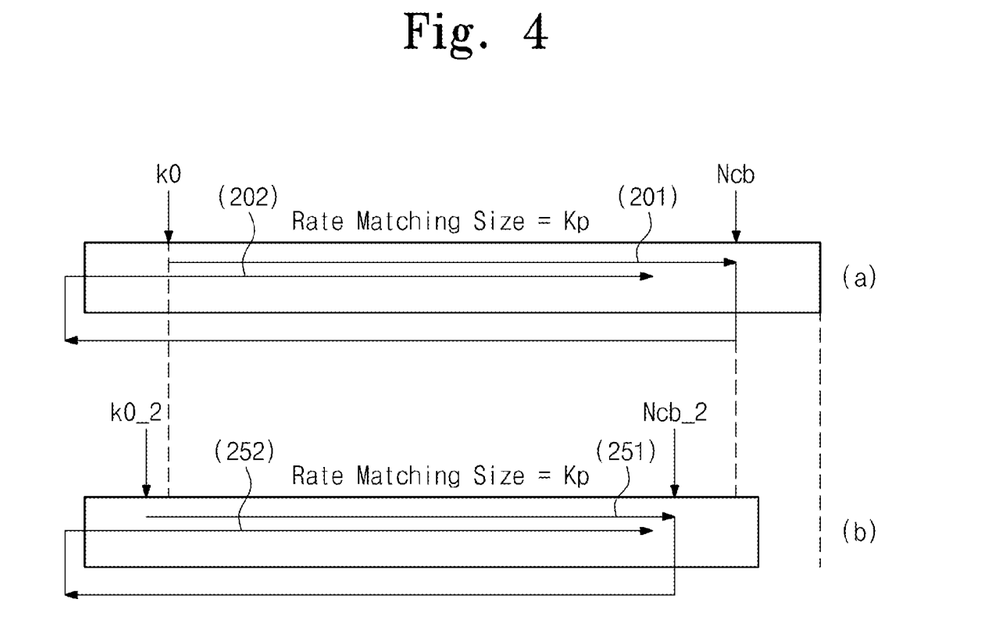
FIG. 4 is a diagram conceptually illustrating an operation of a selector of FIG. 1.

FIG. 4 is a diagram conceptually illustrating an operation of the selector of FIG. 1.

Referring to FIG. 4, the data bit stream collected by the bit collector 30 is illustrated as an example. A portion (a) of FIG. 4 illustrates a data bit stream including a dummy bit (for example, a null bit and a filler bit). A portion (b) of FIG. 4 illustrates a dummy bit stream from which a dummy bit has been removed.

The portion (a) of FIG. 4 illustrates the operation of a general selector, the portion (b) of FIG. 4 illustrates the operation of the selector 60 according to an embodiment of the present invention.

Output parameters are illustrated in the portion (a) of FIG. 4. The output parameter includes a start point K0, an end point (or output data size (range)) Ncb, and a rate matching data size Kp.

When outputting data, the selector 60 selects and outputs data from the start point K0 to the end point Ncb in operation 201. While outputting data, the selector 60 repeatedly selects and outputs data from the first bit to the end point of a data bit stream until data corresponding to the entire data size Kp is outputted in operation 202. Herein, the selector 60 outputs data in series. At this point, the selector 60 removes a dummy bit included in the data bit stream.

Output parameters are illustrated in the portion (b) of FIG. 4. The output parameter includes a start point K0_2, an end point Ncb_2, and a rate matching data size Kp.

The start point K0_2 is set by the output parameter generator 50 according to the removal of dummy bits that are included in a data bit stream before the start point K0. The end point Ncb_2 is set by the output parameter generator 50 according to the removal of dummy bits that are included in a data bit stream before the end point Ncb.

When outputting data, the selector 60 selects and outputs data from the start point K0_2 to the end point Ncb_2 in operation 251. While outputting data, the selector 60 repeatedly selects and outputs data from the first bit to the end point of a data bit stream until data corresponding to the entire data size Kp is outputted in operation 252. Herein, the selector 60 may output data in parallel without the removing operation of a dummy bit.

The selector 60 may output data using the start point K0_2 and end point Ncb_2 that are new parameters, according to the removal of a dummy bit. Therefore, the selector 60 can output rate-matched data without an operation for removing a dummy bit in spite of the parallel output of data.

Figure 5:
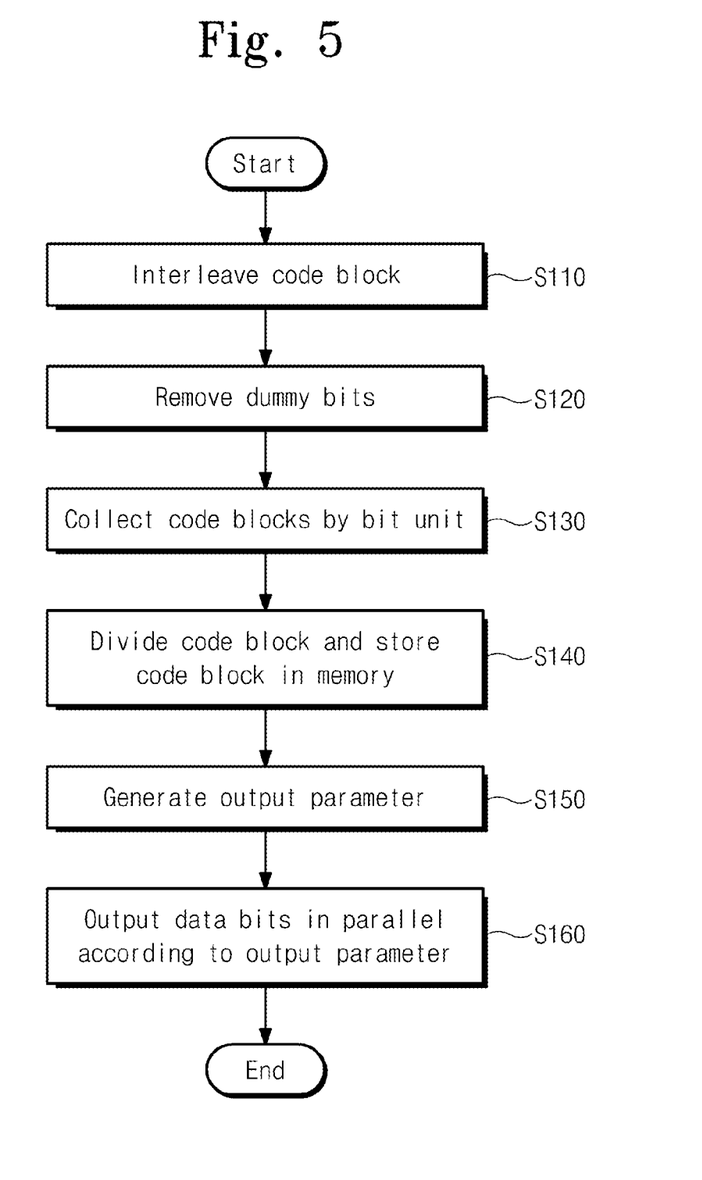
FIG. 5 is a flowchart illustrating a rate matching operation of a rate matching apparatus according to an embodiment of the present invention.

FIG. 5 is a flowchart illustrating a rate matching operation of a rate matching apparatus according to an embodiment of the present invention.

Referring to FIG. 5, each of the first to third sub-block interleavers 11 to 13 performs interleaving by code block units in operation S110. The first to third sub-block interleavers 11 to 13 perform interleaving for the systematic data, the first parity data and the second parity data. The first to third sub-block interleavers 11 to 13 output interleaved code blocks to the dummy bit removers 21 to 23, respectively.

In operation S120, the dummy bit removers 21 to 23 remove dummy bits included in the interleaved code blocks, respectively. The dummy bit removers 21 to 23 output code blocks with the dummy bits removed to the bit collector 30.

In operation S130, the bit collector 30 collects the code blocks with the dummy bits removed, by bit units. The bit collector 30 generates a bit stream through collection of the bit unit. In the data bit stream collected by the bit collector 30, systematic data and parity data are divided. In the parity data, moreover, the bit of the first parity data and the bit of the second parity data may be alternated therebetween.

In operation S140, the bit collector 30 divides the systematic data and parity data included in the data bit stream, and stores the divided data in the memory 40.

In operation S150, the output parameter generator 50 generates an output parameter. The output parameter generator 50 outputs the generated output parameter to the selector 60.

In operation S160, the selector 60 selects the data stored in the memory 40 and outputs the selected data in parallel, on the basis of the output parameter.

The rate matching method according to an embodiment of the present invention processes and outputs data in parallel in rate matching, and thus can enhance data transmission performance compared to a rate matching method that processes and outputs data in series.

The rate matching apparatus according to an embodiment of the present invention may be implemented with an encoder. As an example, the rate matching apparatus may be applied to the transmitter (for example, a base station and a terminal) of a communication system.

According to embodiments of the present invention, the rate matching apparatus processes data bits in parallel in rate matching, thereby enhancing data throughput.

The rate matching apparatus performs rate matching in parallel, and thus can save a time taken in rate matching compared to a method that performs rate matching in series.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A rate matching apparatus comprising:
   a plurality of interleavers interleaving code blocks, respectively;
   a plurality of dummy bit removers removing dummy bits of the interleaved code blocks, respectively;
   a bit collector collecting code blocks with the dummy bits removed by bit units, and dividing a collected data bit stream into systematic data and parity data;
   a memory storing the systematic data and the parity data in parallel;
   a selector outputting in parallel a plurality of data bits which are selected from the systematic data and parity data of the memory; and
   an output parameter generator generating an output parameter on the basis of the systematic data and parity data with the dummy bits removed.

2. The rate matching apparatus of claim 1, wherein the selector selects and outputs data in parallel according to the output parameter.

3. The rate matching apparatus of claim 1, wherein the output parameter comprises a start point, end point and data size of data to be outputted according to removal of the dummy bit.

4. The rate matching apparatus of claim 3, wherein:
   the selector outputs data from the start point to the end point, and
   the selector repeatedly selects data until data, corresponding to the data size, from the first start point to the end point of the data stored in the memory is outputted, and outputs the selected data in parallel.

5. The rate matching apparatus of claim 1, wherein the output parameter generator receives dummy bit removal information based on removal of the dummy bit from the dummy bit removers, and generates the output parameter on the basis of the dummy bit removal information.

6. The rate matching apparatus of claim 1, wherein the memory comprises:
   at least one systematic memory having a plurality of input ports and/or output ports; and
   at least one parity memory having a plurality of input ports and/or output ports.

7. The rate matching apparatus of claim 1, wherein the parity data comprises first and second parity data.

8. The rate matching apparatus of claim 7, wherein the bit collector alternately collects the first and second parity data by bit units when collecting the parity data.

9. The rate matching apparatus of claim 1, wherein the dummy bits comprise a null bit and a filler bit.

10. A rate matching method comprising:
    removing dummy bits of interleaved code blocks;
    dividing code blocks with the dummy bits removed into systematic data and parity data, and storing the divided data in parallel; and
    outputting the stored data in parallel,
    wherein the outputting of the stored data comprises outputting data by using an output parameter for output of data based on removal of the dummy bit.

11. The rate matching method of claim 10, wherein the output parameter comprises a start point, end point and data size of data to be outputted according to removal of the dummy bit.

12. The rate matching method of claim 11, wherein the outputting of the stored data comprises:
    outputting data from the start point to the end point; and
    repeatedly selecting data until data, corresponding to the data size, from the first start point to the end point of the stored data is outputted, and outputs the selected data in parallel.

13. A rate matching method comprising:
    interleaving code blocks;
    removing dummy bits of the interleaved code blocks;
    collecting code blocks with the dummy bits removed, by bit units;
    dividing the collected data bits into systematic data and parity data to store the divided data in parallel; and
    outputting in parallel a plurality of data bits which are selected from the stored systematic data and parity data,
    wherein the outputting of data bits comprises calculating an output parameter on the basis of the systematic data and parity data with the dummy bits removed, and outputting the selected data bits in parallel according to the output parameter.

14. The rate matching method of claim 13, wherein the collecting of code blocks comprises collecting the code blocks with the dummy bits removed as the systematic data and the parity data.

15. The rate matching method of claim 14, wherein as the parity data, first and second parity data are alternately collected by bit units.

16. The rate matching method of claim 13, wherein the output parameter comprises a start point, end point and data size of data to be outputted according to removal of the dummy bit.

17. The rate matching method of claim 13, wherein the dummy bits comprise a null bit and a filler bit.

* * * * *